United States Patent
Yang et al.

(10) Patent No.: US 12,273,742 B2
(45) Date of Patent: Apr. 8, 2025

(54) INFORMATION INDICATION METHOD AND APPARATUS, DEVICE AND STORAGE MEDIUM

(71) Applicant: ZTE CORPORATION, Shenzhen (CN)

(72) Inventors: Zhen Yang, Shenzhen (CN); Nan Zhang, Shenzhen (CN); Wei Cao, Shenzhen (CN); Kaibo Tian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 320 days.

(21) Appl. No.: 17/796,549

(22) PCT Filed: Jun. 3, 2021

(86) PCT No.: PCT/CN2021/098074
§ 371 (c)(1),
(2) Date: Jul. 29, 2022

(87) PCT Pub. No.: WO2021/259031
PCT Pub. Date: Dec. 30, 2021

(65) Prior Publication Data
US 2023/0047742 A1    Feb. 16, 2023

(30) Foreign Application Priority Data
Jun. 24, 2020   (CN) .......................... 202010591923.4

(51) Int. Cl.
*H04W 16/28*   (2009.01)
*H04W 56/00*   (2009.01)
*H04W 84/06*   (2009.01)

(52) U.S. Cl.
CPC ......... *H04W 16/28* (2013.01); *H04W 56/001* (2013.01); *H04W 84/06* (2013.01)

(58) Field of Classification Search
CPC ... H04W 16/28; H04W 56/001; H04W 84/06; H04W 72/046; H04B 7/1853; H04B 7/1851
See application file for complete search history.

(56) References Cited

U.S. PATENT DOCUMENTS

| 2014/0226649 A1* | 8/2014 | Webb ................ H04L 5/0048 370/350 |
| 2018/0103492 A1 | 4/2018 | Akkarakaran et al. |

(Continued)

FOREIGN PATENT DOCUMENTS

| CN | 106358312 A | 1/2017 |
| CN | 107888311 A | 4/2018 |

(Continued)

OTHER PUBLICATIONS

International Search Report for Application No. PCT/CN2021/098074, dated Sep. 3, 2021, 26 pages (including translation).

(Continued)

*Primary Examiner* — Tejis Daya
(74) *Attorney, Agent, or Firm* — Morgan, Lewis & Bockius LLP

(57) ABSTRACT

Provided are an information indication method and apparatus, a device and a storage medium. The information indication method includes: dividing beam identifier (ID) information into first beam ID information and second beam ID information according to a preset rule, where the first beam ID information and the second beam ID information are used for instructing a second node to obtain the beam ID information based on the preset rule; carrying the first beam ID information on a first resource and transmitting the first beam ID information to the second node; and carrying the (Continued)

second beam ID information on a second resource and transmitting the second beam ID information to the second node.

15 Claims, 4 Drawing Sheets

(56) References Cited

U.S. PATENT DOCUMENTS

| | | | |
|---|---|---|---|
| 2019/0045559 A1 | 2/2019 | Huang et al. | |
| 2019/0223118 A1* | 7/2019 | Tomeba | H04W 28/06 |
| 2019/0335517 A1 | 10/2019 | Reial et al. | |
| 2019/0364523 A1* | 11/2019 | Wei | H04W 48/10 |
| 2020/0052782 A1* | 2/2020 | Wang | H04W 74/006 |
| 2020/0100172 A1* | 3/2020 | Wang | H04W 24/02 |
| 2021/0175959 A1* | 6/2021 | Tang | H04B 7/0695 |
| 2023/0283337 A1* | 9/2023 | He | H04L 27/261 |
| | | | 370/252 |
| 2023/0284043 A1* | 9/2023 | Sun | H04W 24/08 |
| | | | 370/252 |
| 2024/0030994 A1* | 1/2024 | Zhao | H04W 36/322 |

FOREIGN PATENT DOCUMENTS

| | | |
|---|---|---|
| CN | 108632841 A | 10/2018 |
| CN | 110545138 A | 12/2019 |
| CN | 110830101 A | 2/2020 |
| CN | 110972257 A | 4/2020 |
| CN | 111294801 A | 6/2020 |
| CN | 111901880 A | 11/2020 |
| WO | 2017111983 A1 | 6/2017 |
| WO | 2018203711 A1 | 11/2018 |
| WO | 2019157911 A1 | 8/2019 |

OTHER PUBLICATIONS

ZTE. "Discussion on DL beam management", R1-1707119, 3GPP TSG RAN WG1 Meeting #89, May 19, 2017, 12 pages.

Extended European Search Report for Application No. 21829699.4, dated Jan. 5, 2024, 13 pages.

First Search Report in Chinese Application No. 2020105919234, dated Nov. 20, 2024, 8 pages.

First Office Action in Chinese Application No. 202010591923.4, dated Nov. 25, 2024, 10 pages.

* cited by examiner $N_{ID}^{(1)} = 0$   +1   +1   +1   +1   +1   +1   +1   +1   +1   +1   +1

$N_{ID}^{(1)} = 1$   +1   −1   +1   −1   +1   −1   +1   −1   +1   −1   +1

$N_{ID}^{(1)} = 2$   +1   −1   −1   +1   +1   +1   −1   −1   +1   −1   +1

$N_{ID}^{(1)} = 15$   −1   −1   −1   +1   −1   +1   −1   +1   +1   −1   −1

INFORMATION INDICATION METHOD AND APPARATUS, DEVICE AND STORAGE MEDIUM

CROSS REFERENCE TO RELATED APPLICATIONS

This application is a national stage application filed under 35 U.S.C. 371 based on International Patent Application No. PCT/CN2021/098074, filed on Jun. 3, 2021, which claims priority to Chinese Patent Application No. 202010591923.4 filed with the CNIPA on Jun. 24, 2020, disclosures of which are incorporated herein by reference in their entireties.

TECHNICAL FIELD

The present application relates to the field of communication, for example, an information indication method and apparatus, a device and a storage medium.

BACKGROUND

Supporting Narrowband Internet of Things (NB-IoT) with non-terrestrial networks (NTNs) is being studied. Since the NB-IoT is an Internet of Things communication standard designed for terrestrial cellular networks, the network architecture of Long Term Evolution (LTE) on which the NB-IoT bases is different from the network architecture of the NTN, and thus there are many problems when the NB-IoT is directly applied to NTN networks.

SUMMARY

The present application provides an information indication method and apparatus, a device and a storage medium, so as to enable a terminal in an NTN network to identify an identifier (ID) of a beam so that the terminal and a base station can communicate using an optimal beam.

Embodiments of the present application provide an information indication method. The method is applied to a first node and includes the following:

Beam ID information is divided into first beam ID information and second beam ID information according to a preset rule, where the first beam ID information and the second beam ID information are used for instructing a second node to obtain the beam ID information based on the preset rule; the first beam ID information is carried on a first resource and transmitted to the second node; and the second beam ID information is carried on a second resource and transmitted to the second node.

Embodiments of the present application further provide an information indication method. The method is applied to a second node and includes the following:

First beam ID information is received on a first resource; second beam ID information is received on a second resource; and beam ID information is determined based on the first beam ID information and the second beam ID information according to a preset rule.

Embodiments of the present application further provide an information indication apparatus. The apparatus is applied to a first node and includes a division module and a transmission module.

The division module is configured to divide beam ID information into first beam ID information and second beam ID information according to a preset rule, where the first beam ID information and the second beam ID information are used for instructing a second node to obtain the beam ID information based on the preset rule. The transmission module is configured to carry the first beam ID information on a first resource and transmit the first beam ID information to the second node; and carry the second beam ID information on a second resource and transmit the second beam ID information to the second node.

Embodiments of the present application further provide an information indication apparatus. The apparatus is applied to a second node and includes a receiving module and a determination module.

The receiving module is configured to receive first beam ID information on a first resource; and receive second beam ID information on a second resource. The determination module is configured to determine beam ID information based on the first beam ID information and the second beam ID information according to a preset rule.

The embodiments of the present application further provide a device. The device includes one or more processors and a memory.

The memory is configured to store one or more programs, where the one or more programs, when executed by the one or more processors, cause the one or more processors to perform the information indication method provided in the embodiments of the present application.

The embodiments of the present application further provide a storage medium. The storage medium is configured to store a computer program, where the computer program, when executed by a processor, performs the information indication method provided in the embodiments of the present application.

In the information indication method and apparatus, the device and the storage medium, the beam ID information is divided into the first beam ID information and the second beam ID information according to the preset rule, where the first beam ID information and the second beam ID information are used for instructing the second node to obtain the beam ID information based on the preset rule; the first beam ID information is carried on the first resource and transmitted to the second node; and the second beam ID information is carried on the second resource and transmitted to the second node, so that the second node receives the first beam ID information and the second beam ID information and then synthesizes the beam ID information according to the preset rule. Therefore, the terminal in an NTN network can identify the ID of the beam and the terminal and the base station can communicate using the optimal beam.

DETAILED DESCRIPTION

Figure 1:
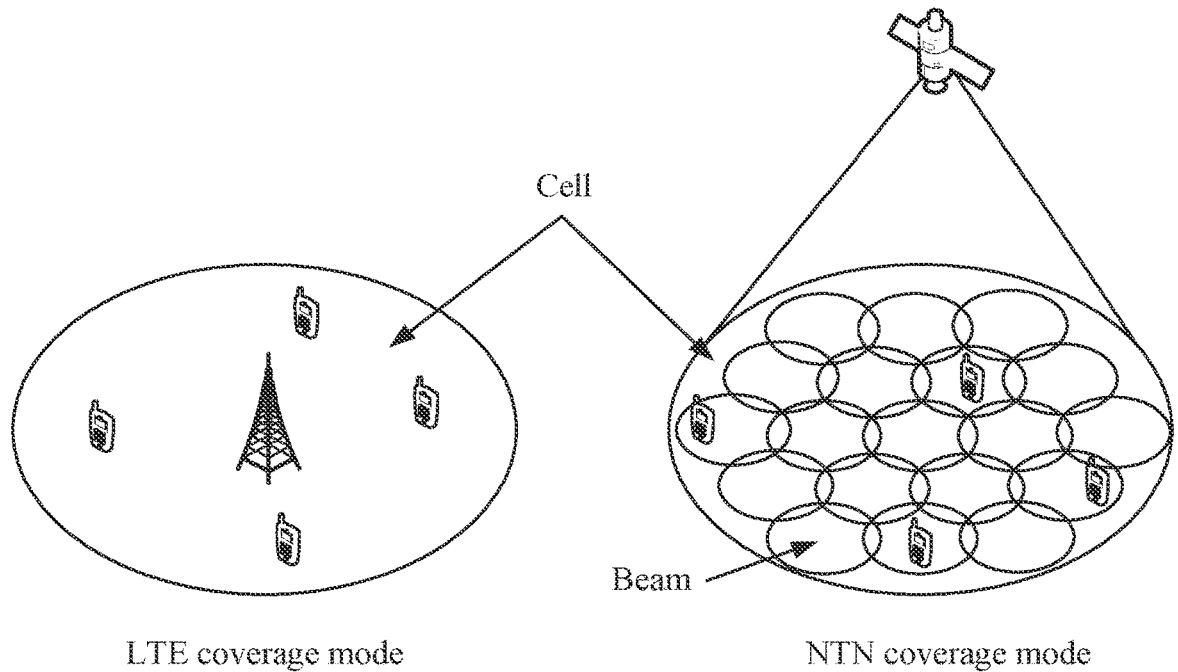
FIG. 1 is a schematic diagram showing the difference between the LTE network architecture and the NTN network architecture.

Embodiments of the present application are described hereinafter in conjunction with drawings.

The methods illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from the sequences described herein.

The technical solutions of the present application may be applied to various communication systems such as Global Systems for Mobile Communications (GSM), Code-Division Multiple Access (CDMA) systems, Wideband Code-Division Multiple Access (WCDMA) systems, General Packet Radio Service (GPRS), Long Term Evolution (LTE) systems, Advanced Long Term Evolution (LTE-A) systems, Universal Mobile Telecommunications System (UMTS), 5th Generation mobile networks (5G) systems and the like, which are not limited to the embodiments of the present application. In the present application, the 5G system is used as an example for description.

In the embodiments of the present application, a base station may be a device capable of communicating with a user equipment (UE). The base station may be any device having a wireless transceiving function, and includes, but is not limited to, a base station (NodeB), an evolved NodeB (eNodeB), a base station in the 5G communication system, a base station in a future communication system, an access node in a Wi-Fi system, a wireless relay node, and a wireless backhaul node. The base station may also be a wireless controller in a Cloud Radio Access Network (C-RAN) scenario, and may also be a small station, a transmission reference point (TRP) and the like, which is not limited to the embodiments of the present application. In the present application, the 5G base station is used as an example for description.

In the embodiments of the present application, the UE is a device having a wireless transceiving function, may be deployed on land, including being deployed an indoor or outdoor, in a hand-held manner, in a wearable manner, and in a vehicle-mounted manner, may also be deployed on the water (for example, being deployed on a ship and the like), and may also be deployed in the air (for example, being deployed on an airplane, a balloon, a satellite and the like). The UE may be a mobile phone, a Pad, a computer having a wireless transceiving function, a virtual reality (VR) terminal, an augmented reality (AR) terminal, a wireless terminal for industrial control, a wireless terminal for self-driving, a wireless terminal for telemedicine, a wireless terminal for smart grid, a wireless terminal for transportation safety, a wireless terminal for smart city, a wireless terminal for smart home and the like. The application scenarios are not limited to the embodiments of the present application. The UE may also sometimes be referred to as a terminal, an access terminal, a UE unit, a UE station, a mobile radio station, a mobile station, a remote station, a remote terminal, a mobile device, a UE terminal, a wireless communication device, a UE agent, a UE device and the like, which is not limited to the embodiments of the present application.

The NTN is an important part of 5G and 6G networks and is used to solve the network coverage problem in remote areas, oceans and isolated islands. The NTN takes a satellite or a high-altitude platform station (HAPS) as the carrier of the base station and has the advantages of large coverage and strong ability to resist natural disasters. The 3rd Generation Partnership Project (3GPP) is planning to use the NTN network to support the NB-IoT traffic. The basic idea is to, with the NB-IoT standard as a basis, analyze the possible problems of applying the NB-IoT standard to the NTN network and then conduct targeted enhancements to relevant aspects. The LTE network architecture on which the NB-IoT bases is different from the NTN network architecture. As shown in FIG. 1, the LTE adopts the conventional cell coverage mode while the NTN adopts the single-cell multi-beam coverage mode in which frequencies between beams are multiplexed.

This difference in coverage modes leads to a series of problems. In a terrestrial NB-IoT network, as long as the UE identifies the ID of a cell, the UE may establish a valid connection with a New Radio (NR) base station (BS) using the ID information of the cell. In the NTN network, one satellite is usually one cell, and the satellite achieves seamless coverage of the cell using multiple beams. In this case, the UE not only needs to identify the ID information of the cell but also needs to identify the ID information of a beam with the best channel condition.

To identify the beam ID information, firstly, a communication link should be established between the UE and the satellite through the beam, and the uplink and downlink data of the UE should be transmitted and received via the beam. Secondly, considering the mobility, the beam ID information is also an important dependence of a series of signaling interactions in the process of UE beam handover. In addition, in the NTN coverage mode, there is interference between beams with the same frequency. In the NB-IoT standard, all interference suppression and circumvention schemes are at a cell level, such as scrambling of a physical broadcast channel (PBCH), mapping of reference signals and the like. For the NTN network, the interference between beams can be effectively suppressed by introducing beam ID information in the process of channel scrambling or resource mapping.

The embodiments of the present application provide the technical solutions below.

Figure 2:
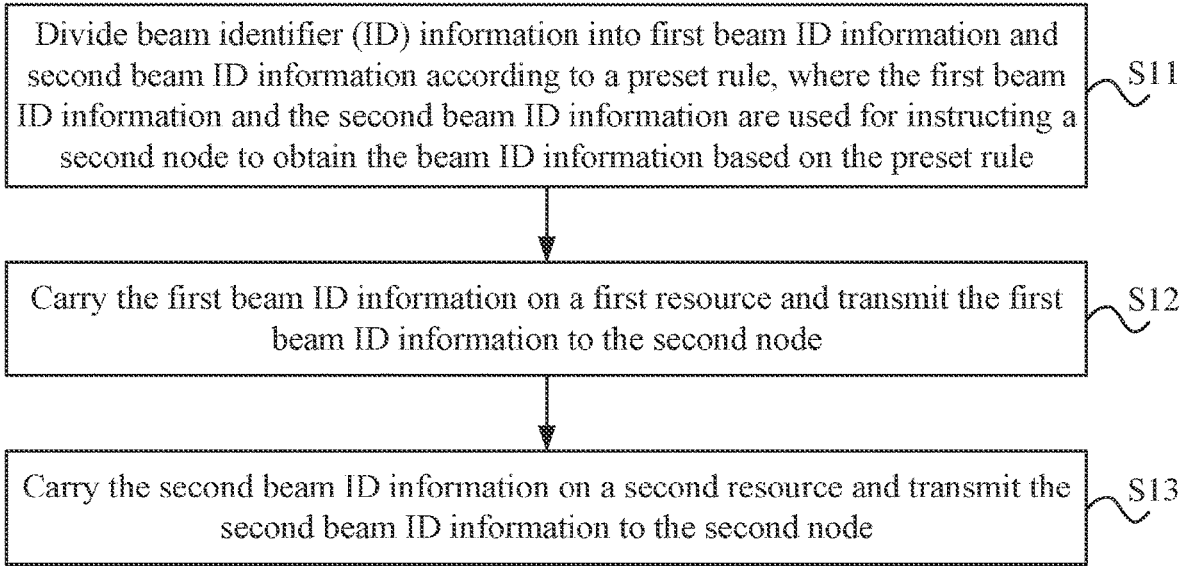
FIG. 2 is a flowchart of an information indication method according to an embodiment of the present application.

In an embodiment, an information indication method is provided. The information indication method is suitable for the scenario where the NB-IoT traffic is implemented in an NTN network. As shown in FIG. 2, the information indication method provided by this embodiment of the present application mainly includes S11, S12 and S13.

In S11, beam ID information is divided into first beam ID information and second beam ID information according to a preset rule, where the first beam ID information and the second beam ID information are used for instructing a second node to obtain the beam ID information based on the preset rule.

In S12, the first beam ID information is carried on a first resource and transmitted to the second node.

In S13, the second beam ID information is carried on a second resource and transmitted to the second node.

The information indication method provided in this embodiment is mainly applied to a first node, and the first node may be any one of the base stations provided above, and the first node is a 5G base station or a 6G base station.

The second node may be any of the UEs provided above. In this embodiment, the first node and the second node are illustrative and not limited.

The beam ID may be understood as the number of each beam in an NTN network system. The beam ID information refers to relevant information that may represent or describe the beam ID.

In this embodiment, the preset rule is a rule determined by the first node and the second node through mutual negotiation. In this embodiment, the set rule is not limited, as long as the first node and the second node use the same rule.

The first resource and the second resource may be understood as channels and/or signaling between the first node and the second node. The first resource and the second resource may be the same or may be different. If the first resource and the second resource are the same, the bearing mode of the first beam ID information on the first resource is different from the bearing mode of the second beam ID information on the second resource.

In an embodiment, the first beam ID information is the number of a beam in a sub-cell, and the second beam ID information is the ID of a sub-cell in a cell.

In an embodiment, the beam ID information, the first beam ID information and the second beam ID information are in a one-to-one correspondence.

The association between $N_{ID}^{Beam}$ and $(N_{ID}^{(1)}, N_{ID}^{(2)})$ has uniqueness, that is, $(N_{ID}^{(1)}, N_{ID}^{(2)})$ may be calculated uniquely by $(N_{ID}^{(1)}, N_{ID}^{(2)})$, and $N_{ID}^{Beam}$ may also be calculated uniquely by $(N_{ID}^{(1)}, N_{ID}^{(2)})$.

The association between $N_{ID}^{Beam}$ and $(N_{ID}^{(1)}, N_{ID}^{(2)})$ is a predefined rule about which the first node and the second node have the same understanding.

In an embodiment, the preset rule is that the beam ID information is the sum of an integer multiple of the second beam ID information and the first beam ID information.

The relationship among the beam $N_{ID}^{Beam}$ information, the first beam $N_{ID}^{(1)}$ information and the second beam $N_{ID}^{(2)}$ information may be flexibly defined, including but not limited to the form of $N_{ID}^{Beam}=kN_{ID}^{(2)}+N_{ID}^{(1)}$, where k is a positive integer.

In an embodiment, the first beam ID information is carried on the first resource and transmitted to the second node in the following manner: the first beam ID information is carried on a synchronization signal (SS) and transmitted to the second node.

The processing process where the first node carries the first beam ID information on the SS is optional. The first node may or may not perform the process described above. However, the first node and the second node should have the same understanding of whether to execute the process described above.

In an embodiment, the first beam ID information is carried on the first resource in the following manner: the first beam ID information is carried on a secondary synchronization signal (SSS) in the SS; or the first beam ID information is carried on a primary synchronization signal (PSS) in the SS.

In an embodiment, the first beam ID information is carried on the SSS in the SS in the following manner: an SSS of the NB-IoT standard is mapped to a set resource element (RE); and data on each orthogonal frequency division multiplexing (OFDM) symbol is weighted according to a weight value of the each OFDM symbol corresponding to the first beam ID information.

In an embodiment, the first beam ID information is carried on the PSS in the SS in the following manner: a root of a pseudo-imposed Zadoff-Chu (ZC) sequence used by the PSS in the NB-IoT standard is extended to a preset number, where each root corresponds to one piece of different first beam ID information.

In an embodiment, the first beam ID information is carried on the first resource and transmitted to the second node in the following manner: a physical broadcast channel (PBCH) signal is scrambled using the first beam ID information; and the PBCH signal is transmitted to the second node.

When the first node scrambles the PBCH using the first beam ID information, the scrambling sequence includes the first beam ID information in the bit-level scrambling processing of the PBCH.

In an embodiment, the second resource includes one or more of: master information block (MIB) signaling, system information block (SIB) signaling, radio resource control (RRC) signaling or a PBCH cyclic redundancy check (CRC) mask.

In an embodiment, beams located in the same cell transmit the same MIB signaling.

Figure 3:
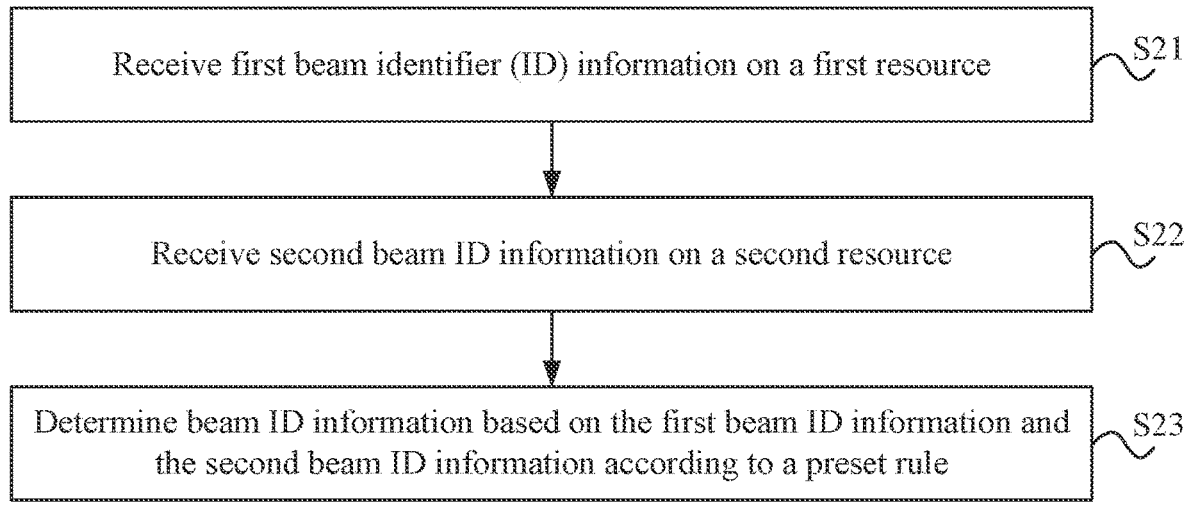
FIG. 3 is a flowchart of an information indication method according to an embodiment of the present application.

In an embodiment, an information indication method is provided. The information indication method is suitable for the scenario where the NB-IoT traffic is implemented in an NTN network. As shown in FIG. 3, the information indication method provided by this embodiment of the present application mainly includes S21, S22 and S23.

S12, first beam ID information is received on a first resource.

In S22, second beam ID information is received on a second resource.

In S23, beam ID information is determined based on the first beam ID information and the second beam ID information according to a preset rule.

The information indication method provided in this embodiment is mainly applied to a second node, the second node may be any one of the UEs provided above, the first node may be any one of the base stations provided above, and the first node is a 5G base station or a 6G base station. In this embodiment, the first node and the second node are illustrative and not limited.

In an embodiment, the first beam ID information is the number of a beam in a sub-cell, and the second beam ID information is the ID of a sub-cell in a cell.

In an embodiment, the beam ID information, the first beam ID information and the second beam ID information are in a one-to-one correspondence.

In an embodiment, the preset rule is that the beam ID information is the sum of an integer multiple of the second beam ID information and the first beam ID information.

In an embodiment, beams located in the same cell transmit the same MIB signaling.

In an embodiment, in an NTN communication system, each satellite constitutes a logical cell with a cell ID of $N_{ID}^{Cell}$. The cell is divided into multiple sub-cells, each sub-cell is composed of multiple beams, and three frequencies are multiplexed among the beams, as shown in FIG. 4.

Figure 4:
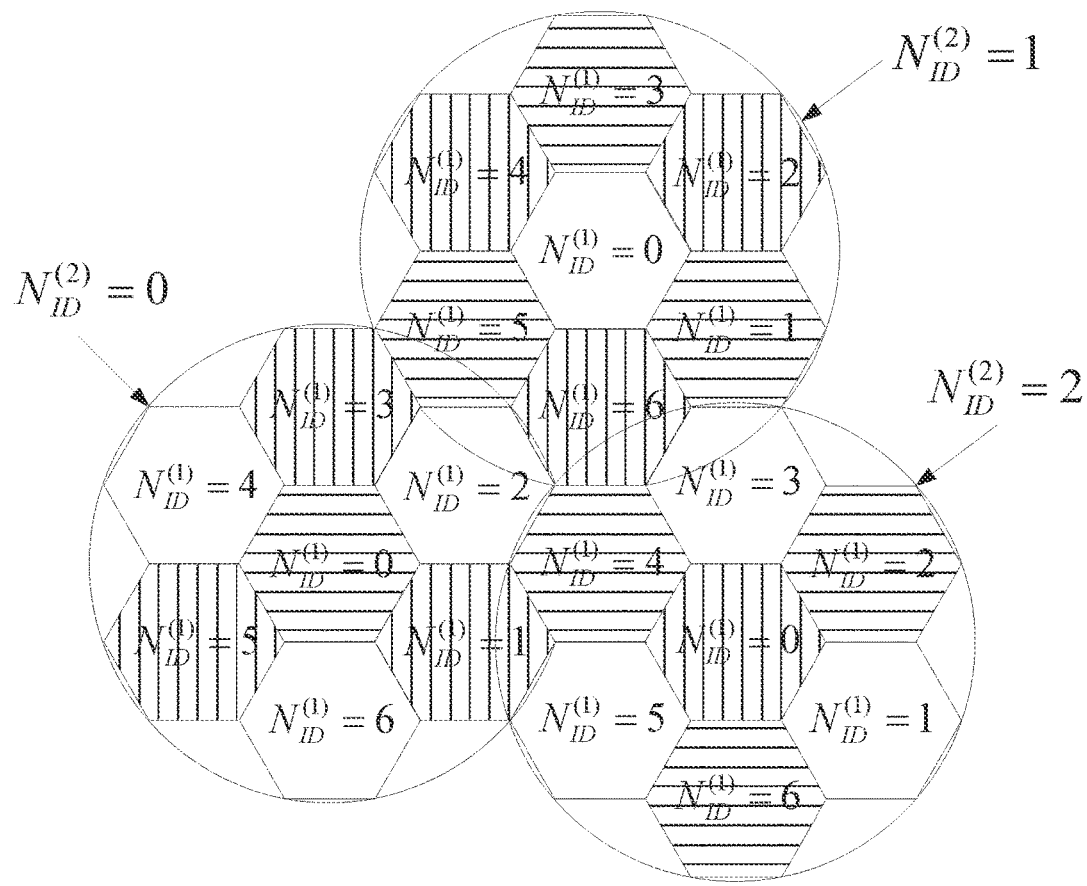
FIG. 4 is a schematic diagram of frequency multiplexing between beams according to an embodiment of the present application.

In the system shown in FIG. 4, the beam ID $N_{ID}^{Beam}$ is defined as 0 to 223, where the value range of the first beam ID $N_{ID}^{(1)}$ is 0 to 6, and the value range of the second beam ID $N_{ID}^{(2)}$ is 0 to 31. The relationship among $N_{ID}^{Beam}$, $N_{ID}^{(1)}$ and $N_{ID}^{(2)}$ may be described by the following expression:

$$N_{ID}^{Beam}=7N_{ID}^{(2)}+N_{ID}^{(1)}.$$

In this embodiment, the BS does not carry the first beam ID $N_{ID}^{(1)}$ information in the SS.

The BS carries the second beam ID $N_{ID}^{(2)}$ information in a MIB message, and the MIB message is carried in a PBCH.

The BS scrambles the PBCH using the first beam ID $N_{ID}^{(1)}$ information. The random seed of the PBCH scrambling in the NB-IoT is $c_{init}=N_{ID}^{Ncell}$, where $N_{ID}^{Ncell}$ identifies the cell ID. In order to introduce the first beam ID $N_{ID}^{(1)}$ information into the scrambling sequence, the random seed is modified herein to $c_{init}=N_{ID}^{(1)} \cdot 2^9 + N_{ID}^{Ncell}$.

The UE detects the PSS transmitted by the cell to obtain frame timing synchronization, and then detects the SSS transmitted by the cell to obtain the cell ID $N_{ID}^{Ncell}$ information.

The UE performs blind detection on a PBCH signal. The BS side introduces the first beam ID $N_{ID}^{(1)}$ information into the scrambling sequence of the PBCH, that is, the BS side carries the $N_{ID}^{(1)}$ information on the PBCH, and the $N_{ID}^{(1)}$ information may be obtained by detecting the PBCH.

In an embodiment, the value space of the first beam ID $N_{ID}^{(1)}$ is small, and the UE may assume that $N_{ID}^{(1)}$ is equal to each number from 0 to 6 respectively and perform blind detection on the PBCH. Once the CRC check passes, the UE may obtain the $N_{ID}^{(1)}$ information. Meanwhile, the $N_{ID}^{(2)}$ information may be obtained through the MIB message carried by the PBCH.

The UE calculates the beam ID information through a predefined expression $N_{ID}^{Beam}=7N_{ID}^{(2)}+N_{ID}^{(1)}$.

In an embodiment, in an NTN communication system, each satellite constitutes a logical cell with a cell ID of $N_{ID}^{Cell}$.

In the above-mentioned system, the beam ID is defined as a field with a length of 10 bits, where the lower-order 4 bits identify the $N_{ID}^{(1)}$ information, and the upper-order 6 bits identify the $N_{ID}^{(2)}$ information.

In this embodiment, the BS carries the $N_{ID}^{(1)}$ information on the SSS in the SS.

Figure 5:
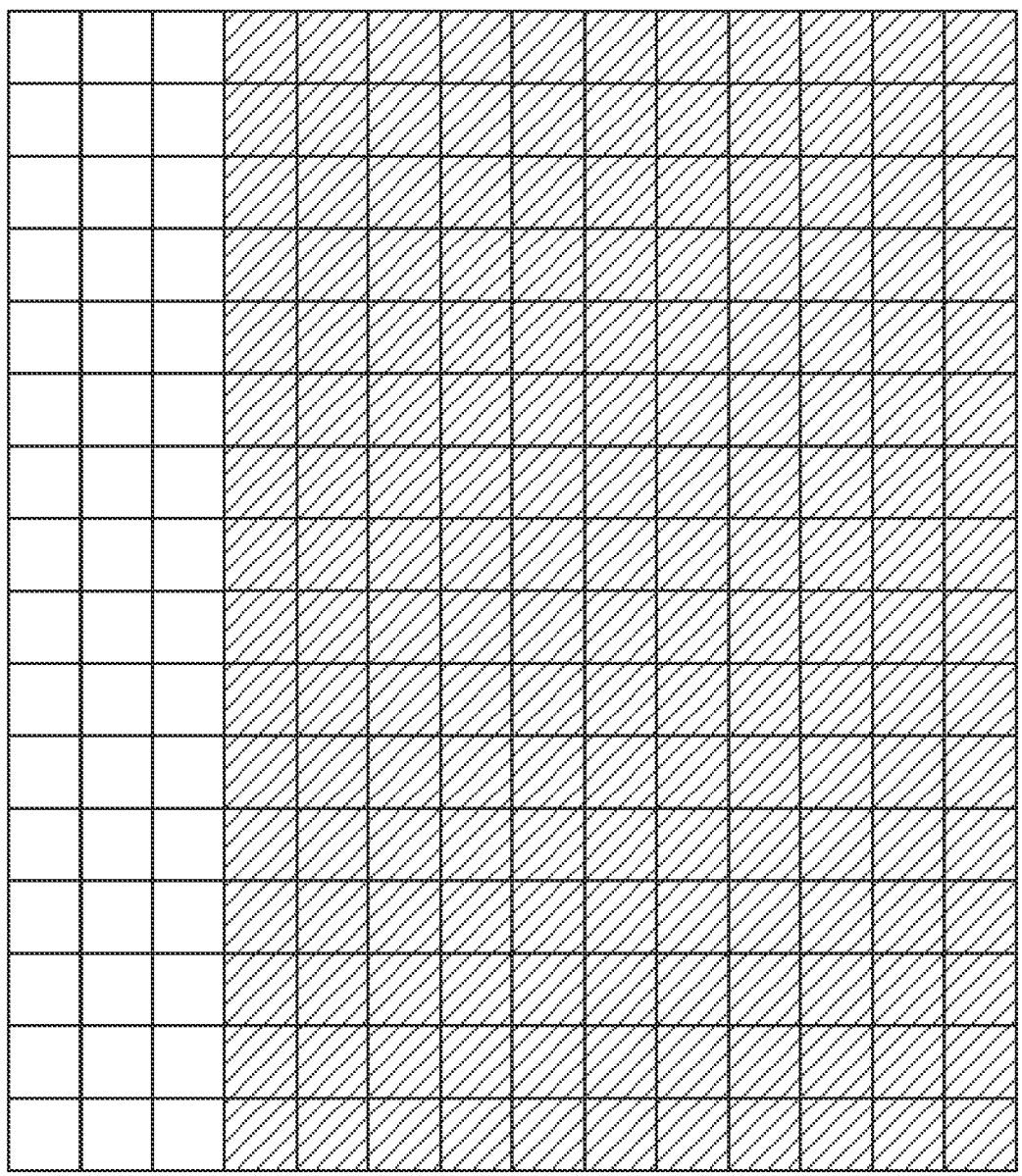
FIG. 5 is a schematic diagram showing the correspondence between first beam ID information weights and OFDM symbols according to an embodiment of the present application.

The bearing mode is as follows: firstly, the SSS of the NB-IoT standard is mapped to REs shown by diagonal stripes in FIG. 5, and then the data on each OFDM symbol is weighted according to the weight value on each symbol corresponding to $N_{ID}^{(1)}$. The BS carries the $N_{ID}^{(2)}$ information in the CRC mask of the PBCH. In this embodiment, the length of the mask is 16 bits, and the mask set corresponding to $N_{ID}^{(2)}$ is $[c_0'', c_1'', c_2'', \ldots, c_{14}'', c_{15}'']$, where $0 \leq n \leq N_{ID}^{(2)}$. Assuming the CRC check bits of the PBCH are $[b_0, b_1, b_2, \ldots, b_{14}, b_{15}]$, the check fields actually transmitted are $[d_0, d_1, d_2, \ldots, d_{14}, d_{15}]$, where $d_k = c_k \oplus b_k$ and $0 \leq k \leq 15$.

The BS uses the $N_{ID}^{(1)}$ information to scramble the PBCH, where the random seed of the scrambling sequence is $c_{init}=N_{ID}^{(1)} \cdot 2^9 + N_{ID}^{Ncell}$.

The UE detects the PSS transmitted by the cell to obtain frame timing synchronization, and then detects the SSS transmitted by the cell to obtain the cell ID $N_{ID}^{Ncell}$ information and the $N_{ID}^{(1)}$ information.

The UE descrambles and decodes the PBCH using the detected $N_{ID}^{Ncell}$ and $N_{ID}^{(1)}$. The CRC mask is calculated after decoding. If the mask is one of the corresponding mask set $[c_0'', c_1'', c_2'', \ldots, c_{14}'', c_{15}'']$ corresponding to $N_{ID}^{(2)}$, the PBCH detection is considered to be successful, and the $N_{ID}^{(2)}$ information corresponding to the mask is obtained; otherwise, the PBCH detection fails, and it is necessary to search the synchronization signal or combine more PBCH data blocks for combined detection.

If the detection succeeds, the UE combines $N_{ID}^{(1)}$ and $N_{ID}^{(2)}$ to obtain the beam ID $N_{ID}^{Beam}$ information.

In an embodiment, in an NTN communication system, each satellite constitutes a logical cell with a cell ID of $N_{ID}^{Cell}$.

In the above-mentioned system, the value range of $N_{ID}^{(1)}$ is 0 to 6, the value range of $N_{ID}^{(2)}$ and the relationship among $N_{ID}^{Beam}$, $N_{ID}^{(1)}$ and $N_{ID}^{(2)}$ is expressed as $N_{ID}^{Beam}=7N_{ID}^{(2)}+N_{ID}^{(1)}$.

In this embodiment, the BS carries the $N_{ID}^{(1)}$ information on the PSS in the SS. The bearing mode is as follows: the number of roots of the ZC sequence used by the PSS in the NB-IoT standard is extended from 1 to 7, where each root corresponds to a different $N_{ID}^{(1)}$.

The BS carries the $N_{ID}^{(2)}$ information in the MIB message.

The BS uses the $N_{ID}^{(1)}$ information to scramble the PBCH, where the random seed of the scrambling sequence is $c_{init}=N_{ID}^{(1)} \cdot 2^9 + N_{ID}^{Ncell}$.

The UE detects the PSS transmitted by the cell to obtain frame timing synchronization and the $N_{ID}^{(1)}$ information, and then detects the SSS to obtain the cell ID information.

The UE descrambles and decodes the PBCH using the detected $N_{ID}^{Ncell}$ and $N_{ID}^{(1)}$, and after the CRC check passes, extracts the $N_{ID}^{(2)}$ information from the MIB message.

The UE calculates the beam ID information through a predefined expression $N_{ID}^{Beam}=7N_{ID}^{(2)}+N_{ID}^{(1)}$.

Figure 6:
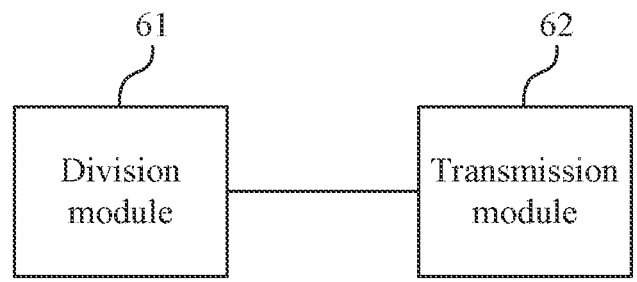
FIG. 6 is a structural schematic diagram of an information indication apparatus according to an embodiment of the present application.

In an embodiment, an information indication apparatus is provided. The information indication apparatus is suitable for the scenario where the NB-IoT traffic is implemented in an NTN network. As shown in FIG. 6, the information indication apparatus provided by this embodiment of the present application mainly includes a division module 61 and a transmission module 62.

The division module 61 is configured to divide beam ID information into first beam ID information and second beam ID information according to a preset rule, where the first beam ID information and the second beam ID information are used for instructing a second node to obtain the beam ID information based on the preset rule. The transmission module 62 is configured to carry the first beam ID information on a first resource and transmit the first beam ID information to the second node; and carry the second beam ID information on a second resource and transmit the second beam ID information to the second node.

In an embodiment, the beam ID information, the first beam ID information and the second beam ID information are in a one-to-one correspondence.

In an embodiment, the preset rule is that the beam ID information is the sum of an integer multiple of the second beam ID information and the first beam ID information.

In an embodiment, the first beam ID information is carried on the first resource and transmitted to the second node in the following manner: the first beam ID information is carried on an SS and transmitted to the second node.

In an embodiment, the first beam ID information is carried on the first resource in the following manner: the first beam ID information is carried on an SSS in the SS; or the first beam ID information is carried on a PSS in the SS.

In an embodiment, the first beam ID information is carried on the SSS in the SS in the following manner: an SSS of the NB-IoT standard is mapped to a set RE; and data on each OFDM symbol is weighted according to a weight value of the each OFDM symbol corresponding to the first beam ID information.

In an embodiment, the first beam ID information is carried on the PSS in the SS in the following manner: a root of a pseudo-imposed ZC sequence used by the PSS in the NB-IoT standard is extended to a preset number, where each root corresponds to one piece of different first beam ID information.

In an embodiment, the first beam ID information is carried on the first resource and transmitted to the second node in the following manner: a PBCH signal is scrambled using the first beam ID information; and the PBCH signal is transmitted to the second node.

In an embodiment, the second resource includes one or more of: MIB signaling, SIB signaling, RRC signaling or a PBCH CRC mask.

In an embodiment, beams located in the same cell transmit the same MIB signaling.

The information indication apparatus provided by this embodiment can execute the information indication method provided by any of the embodiments of the present application and has functional modules and effects corresponding to the executed method. For technical details that are not described in detail in this embodiment, reference may be made to the information indication method provided by any of the embodiments of the present application.

Units and modules involved in the embodiments of the information indication apparatus are just divided according to functional logic, and the division is not limited to this, as long as the corresponding functions can be implemented. In addition, the names of functional units are just intended to distinguish, and not to limit the scope of the present application.

Figure 7:
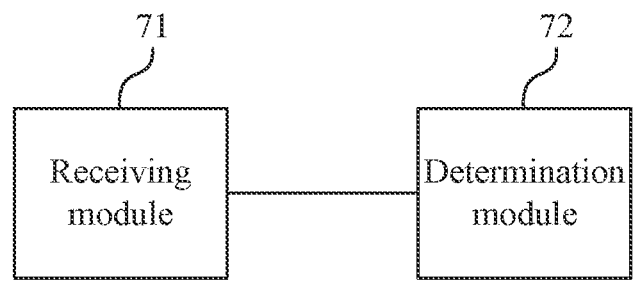
FIG. 7 is a structural schematic diagram of an information indication apparatus according to an embodiment of the present application.

In an embodiment, an information indication apparatus is provided. The information indication apparatus is suitable for the scenario where the NB-IoT traffic is implemented in an NTN network. As shown in FIG. 7, the information indication apparatus provided by this embodiment of the present application mainly includes a receiving module 71 and a determination module 72.

The receiving module 71 is configured to receive first beam ID information on a first resource; and receive second beam ID information on a second resource. The determination module 72 is configured to determine beam ID information based on the first beam ID information and the second beam ID information according to a preset rule.

In an embodiment, the first beam ID information is the number of a beam in a sub-cell, and the second beam ID information is the ID of a sub-cell in a cell.

In an embodiment, the beam ID information, the first beam ID information and the second beam ID information are in a one-to-one correspondence.

In an embodiment, the preset rule is that the beam ID information is the sum of an integer multiple of the second beam ID information and the first beam ID information.

In an embodiment, beams located in the same cell transmit the same MIB signaling.

The information indication apparatus provided by this embodiment can execute the information indication method provided by any of the embodiments of the present application and has functional modules and effects corresponding to the executed method. For technical details that are not described in detail in this embodiment, reference may be made to the information indication method provided by any of the embodiments of the present application.

Units and modules involved in the embodiments of the information indication apparatus are just divided according to functional logic, and the division is not limited to this, as long as the corresponding functions can be implemented. In addition, the names of functional units are just intended to distinguish, and not to limit the scope of the present application.

Figure 8:
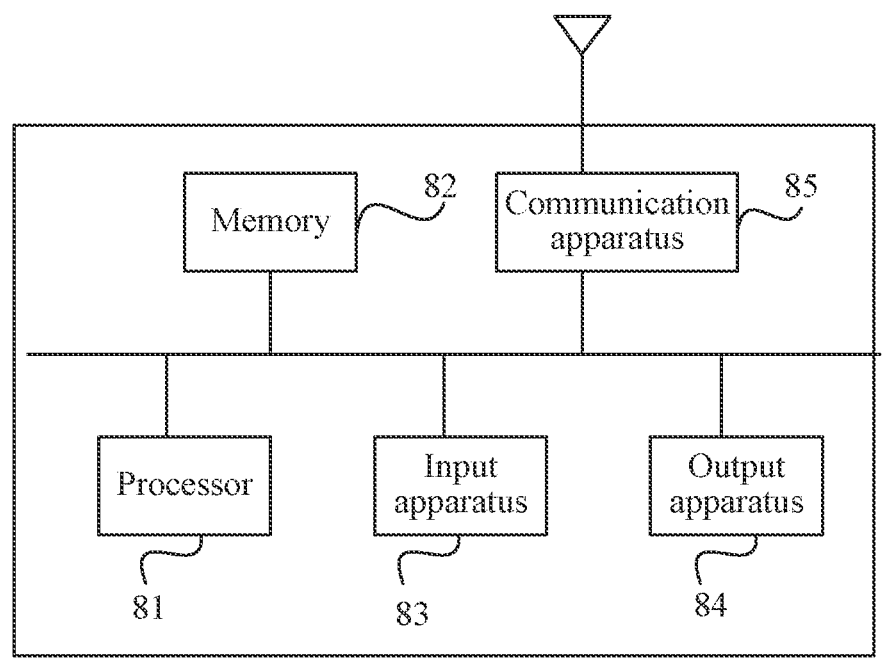
FIG. 8 is a structural schematic diagram of a device according to an embodiment of the present application.

The embodiments of the present application further provide a device. FIG. 8 is a structural schematic diagram of a device according to an embodiment of the present application. As shown in FIG. 8, the device includes a processor 81, a memory 82, an input apparatus 83, an output apparatus 84 and a communication apparatus 85. The number of processors 81 in the device may be one or more, and one processor 81 is illustrated in FIG. 8. The processor 81, the memory 82, the input apparatus 83 and the output apparatus 84 in the device may be connected to each other via a bus or in other ways, and the connection via a bus is illustrated in FIG. 8.

As a computer-readable storage medium, the memory 82 may be configured to store software programs, computer-executable programs and modules, such as program instructions/modules corresponding to the information indication method in the embodiments of the present application (for example, the division module 61 and the transmission module 62 in the information indication apparatus) or program instructions/modules corresponding to the information indication method in the embodiments of the present application (for example, the receiving module 71 and the determination module 72 in the information indication apparatus). The processor 81 runs the software programs, instructions and modules stored in the memory 82 to perform function applications and data processing of the device, that is, to implement any of the methods provided by the embodiments of the present application.

The memory 82 may mainly include a program storage region and a data storage region, where the program storage region may store an operating system and an application program required by at least one function while the data storage region may store data created depending on use of the device. In addition, the memory 82 may include a high-speed random-access memory, and may also include a non-volatile memory such as at least one disk memory, flash memory or other non-volatile solid-state memories. In some examples, the memory 82 may include memories which are remotely disposed relative to the processor 81, and these remote memories may be connected to the device via a network. Examples of the preceding network include, but are not limited to, the Internet, an intranet, a local area network, a mobile communication network, and a combination thereof.

The input apparatus 83 may be used for receiving inputted digital or character information and for generating soft key signal input related to user settings and function control of the device. The output apparatus 84 may include a display screen and other display devices.

The communication apparatus 85 may include a receiver and a transmitter. The communication apparatus 85 is configured to perform information transceiving and communication under the control of the processor 81.

In an example embodiment, the embodiments of the present application further provide a storage medium including computer-executable instructions, where the computer-executable instructions are used for, when executed by a computer processor, performing an information indication method. The method includes the following operations.

Beam ID information is divided into first beam ID information and second beam ID information according to a preset rule, where the first beam ID information and the second beam ID information are used for instructing a second node to obtain the beam ID information based on the preset rule; the first beam ID information is carried on a first resource and transmitted to the second node; and the second beam ID information is carried on a second resource and transmitted to the second node.

In the storage medium including computer-executable instructions provided by the embodiments of the present application, the computer-executable instructions implement not only the method operations described above but also related operations in the information indication method provided by the embodiments of the present application.

In an example embodiment, the embodiments of the present application further provide a storage medium including computer-executable instructions, where the computer-executable instructions are used for, when executed by a computer processor, performing an information indication method. The method includes the following operations.

First beam ID information is received on a first resource; second beam ID information is received on a second resource; and beam ID information is determined based on the first beam ID information and the second beam ID information according to a preset rule.

In the storage medium including computer-executable instructions provided by the embodiments of the present application, the computer-executable instructions implement not only the method operations described above but also related operations in the information indication method provided by the embodiments of the present application.

From the preceding description of the embodiments, the present application may be implemented by means of software and general-purpose hardware and may also be implemented by means of hardware. The technical solutions of the present application may essentially be embodied in the form of a software product. The software product in a computer may be stored in a computer-readable storage medium such as a floppy disk, read-only memory (ROM), random-access memory (RAM), flash memory, hard disk or optical disc in the computer and includes multiple instructions for enabling a computer device (which may be a personal computer, a server or a network device) to execute the methods of the embodiments of the present application.

The term user terminal encompasses any appropriate type of radio user device, such as a mobile phone, a portable data processing apparatus, a portable web browser or a vehicle-mounted mobile station.

In general, multiple embodiments of the present application may be implemented in hardware, a special-purpose circuit, software, logic, or any combination thereof. For example, some aspects may be implemented in hardware while other aspects may be implemented in firmware or software that may be executed by a controller, a microprocessor, or other computing apparatuses, though the present application is not limited thereto.

The embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be in any type suitable for the local technical environment and may be implemented using any suitable data storage technology, for example, but not limited to, a read-only memory (ROM), a random-access memory (RAM), and an optical memory apparatus and system (a digital video disc (DVD) or a compact disk (CD)). Computer-readable media may include non-transitory storage media. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. An information indication method, applied to a first node and comprising:
dividing beam identifier (ID) information into first beam ID information and second beam ID information according to a preset rule, wherein the first beam ID information and the second beam ID information are used for instructing a second node to obtain the beam ID information based on the preset rule;
carrying the first beam ID information on a first resource and transmitting the first beam ID information to the second node; and
carrying the second beam ID information on a second resource and transmitting the second beam ID information to the second node;
wherein the preset rule is that the beam ID information is a sum of an integer multiple of the second beam ID information and the first beam ID information.

2. The method of claim 1, wherein the first beam ID information is a number of a beam in a sub-cell, and the second beam ID information is an ID of a sub-cell in a cell.

3. The method of claim 1, wherein the beam ID information, the first beam ID information and the second beam ID information are in a one-to-one correspondence.

4. The method of claim 1, wherein the carrying the first beam ID information on a first resource and transmitting the first beam ID information to the second node comprises:
carrying the first beam ID information on a synchronization signal (SS) and transmitting the first beam ID information to the second node.

5. The method of claim 4, wherein the carrying the first beam ID information on a first resource comprises:
carrying the first beam ID information on a secondary synchronization signal (SSS) in the SS; or
carrying the first beam ID information on a primary synchronization signal (PSS) in the SS.

6. The method of claim 5, wherein the carrying the first beam ID information on an SSS in the SS comprises:
mapping an SSS of the Narrowband Internet of Things (NB-IoT) standard to a set resource element; and
weighting data on each orthogonal frequency division multiplexing (OFDM) symbol in the set resource element according to a weight value of the each OFDM symbol corresponding to the first beam ID information.

7. The method of claim 5, wherein the carrying the first beam ID information on a PSS in the SS comprises:
extending a root of a pseudo-imposed Zadoff-Chu (ZC) sequence used by the PSS in the NB-IoT standard to a preset number, wherein the preset number of roots correspond to different first beam ID information.

8. The method of claim 1, wherein the carrying the first beam ID information on a first resource and transmitting the first beam ID information to the second node comprises:
scrambling a physical broadcast channel (PBCH) signal using the first beam ID information; and
transmitting the PBCH signal to the second node.

9. The method of claim 1, wherein the second resource comprises at least one of:
master information block (MIB) signaling, system information block (SIB) signaling, radio resource control (RRC) signaling or a PBCH cyclic redundancy check (CRC) mask.

10. The method of claim 9, wherein beams located in a same cell transmit same MIB signaling.

11. An information indication method, applied to a second node and comprising:
receiving first beam identifier (ID) information on a first resource;
receiving second beam ID information on a second resource; and
determining beam ID information based on the first beam ID information and the second beam ID information according to a preset rule, wherein the preset rule is that the beam ID information is a sum of an integer multiple of the second beam ID information and the first beam ID information.

12. A device, comprising:
at least one processor; and
a memory, configured to store at least one program;
wherein the at least one program, when executed by the at least one processor, causes the at least one processor to perform the following steps:
dividing beam identifier (ID) information into first beam ID information and second beam ID information according to a preset rule, wherein the first beam ID information and the second beam ID information are used for instructing a second node to obtain the beam ID information based on the preset rule;
carrying the first beam ID information on a first resource and transmitting the first beam ID information to the second node; and
carrying the second beam ID information on a second resource and transmitting the second beam ID information to the second node;
wherein the preset rule is that the beam ID information is a sum of an integer multiple of the second beam ID information and the first beam ID information.

13. A non-transitory storage medium storing a computer program, wherein the computer program, when executed by a processor, performs the information indication method of claim 1.

14. A device, comprising:
at least one processor; and
a memory, configured to store at least one program;
wherein the at least one program, when executed by the at least one processor, causes the at least one processor to perform the information indication method of claim 11.

15. A non-transitory storage medium storing a computer program, wherein the computer program, when executed by a processor, performs the information indication method of claim 11.

* * * * *